US010345955B2

(12) United States Patent
Lee et al.

(10) Patent No.: US 10,345,955 B2
(45) Date of Patent: Jul. 9, 2019

(54) TOUCH SENSOR INCLUDING DRIVING ELECTRODE CONNECTED TO DRIVING CHANNEL FOR EACH DIVIDED AREA

(71) Applicant: DONGWOO FINE-CHEM CO., LTD., Jeollabuk-do (KR)

(72) Inventors: Cheol Hun Lee, Gyeonggi-do (KR); Byung Jin Choi, Gyeonggi-do (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 47 days.

(21) Appl. No.: 15/526,116

(22) PCT Filed: Oct. 14, 2015

(86) PCT No.: PCT/KR2015/010826
§ 371 (c)(1),
(2) Date: May 11, 2017

(87) PCT Pub. No.: WO2016/085116
PCT Pub. Date: Jun. 2, 2016

(65) Prior Publication Data
US 2017/0322667 A1 Nov. 9, 2017

(30) Foreign Application Priority Data
Nov. 26, 2014 (KR) .......................... 10-2014-0166601

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01); *G06F 2203/04111* (2013.01)

(58) Field of Classification Search
CPC ........ G06F 3/0416; G06F 3/041; G06F 3/044; G06F 2203/04111
See application file for complete search history.

(56) References Cited

U.S. PATENT DOCUMENTS

| | | | |
|---|---|---|---|
| 2011/0210936 A1 | 9/2011 | Wang et al. | |
| 2011/0227858 A1* | 9/2011 | An | G06F 3/044 345/174 |
| 2013/0021296 A1 | 1/2013 | Min et al. | |

FOREIGN PATENT DOCUMENTS

| | | |
|---|---|---|
| CN | 102193669 A | 9/2011 |
| CN | 102760019 A | 10/2012 |

(Continued)

OTHER PUBLICATIONS

International Search Report for PCT/KR2015/010826.

*Primary Examiner* — Lisa S Landis
(74) *Attorney, Agent, or Firm* — The PL Law Group, PLLC

(57) ABSTRACT

A touch sensor includes a driving electrode which includes at least two divided areas electrically separated from each other, wherein each divided area includes first patterns connected to each other in a first direction and second patterns extending from the first pattern in a second direction, and a receiving electrode which is formed on the same plane as the driving electrode in the second direction, wherein the driving electrodes are respectively connected to separate driving channels by driving electrode wirings for each divided area, such that it is possible to sense touch positions over the entire area only by a smaller number of channels. Thereby, it is possible to significantly reduce the bezel width, and may maintain excellent touch sensitivity while significantly shortening the touch recognition time.

8 Claims, 3 Drawing Sheets

(56) References Cited

FOREIGN PATENT DOCUMENTS

| | | |
|---|---|---|
| CN | 103576955 A | 2/2014 |
| CN | 203480481 U | 3/2014 |
| CN | 104020912 A | 9/2014 |
| KR | 10-2011-0104349 A | 9/2011 |
| KR | 10-2013-0012491 A | 2/2013 |
| KR | 10-2013-0038752 A | 4/2013 |
| KR | 10-2013-0133381 A | 12/2013 |
| KR | 2014-0100091 A | 8/2014 |
| TW | 201133065 A | 10/2011 |
| WO | WO 2013-100450 A1 | 7/2013 |
| WO | 2013180438 A1 | 12/2013 |

\* cited by examiner

TOUCH SENSOR INCLUDING DRIVING ELECTRODE CONNECTED TO DRIVING CHANNEL FOR EACH DIVIDED AREA

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/010826, filed Oct. 14, 2015, which claims priority to the benefit of Korean Patent Application No. 10-2014-0166601 filed in the Korean Intellectual Property Office on Nov. 26, 2014, the entire contents of which are incorporated herein by reference.

BACKGROUND OF THE INVENTION

1. Field of the Invention

The present invention relates to a touch sensor.

2. Description of the Related Art

A touch sensor refers to a device for sensing a user's touch generated at a specific position on a panel that is overlappingly installed on a display screen or separately installed from the display screen. In this case, the obtained information indicating whether a touch occurs and touch position information are used for an operation control of a computer system in which a touch sensor is equipped, a screen manipulation, and the like.

To this end, a touch sensor is provided on a front surface of an image display device to convert a touch position directly touched by a human finger or an object into an electric signal. Therefore, instruction contents selected at the touch position are received as an input signal.

Such a touch sensor has driving electrodes and receiving electrodes formed in a display area for displaying an image, such that touch events generated within the display area are recognized as the input signal. That is, in the case of the image display device provided with the touch sensor, the display area serves as a display area for displaying the image, as well as a touch display area to which a touch may be input.

Meanwhile, a bezel area of the touch sensor includes a non-display area outside the display area, and the non-display area is provided with wiring lines connected to the sensing lines and a pad part connected to an external driving circuit.

Generally, the wiring lines extend from the driving electrodes and the receiving electrodes to the pad part in a long side direction of the touch sensor, and a width of the non-display area is determined depending on the number of wiring lines and a wiring width.

However, as the touch sensor becomes larger, the number of receiving channels is increased, and thereby the size of the non-display area is also increased.

To solve the above problem, when the wiring width of the wiring lines is reduced, a wiring resistance is increased, such that electrical characteristics of the touch sensing may be deteriorated. Therefore, there is a limit on a method for reducing the size of the non-display area by reducing the wiring width.

As a result, a method for more effectively reducing the size of the non-display area of the touch sensor to implement a narrow bezel is required.

Korean Patent Laid-Open Publication No. 2014-100091 discloses a touch screen panel.

SUMMARY

It is an object of the present invention to provide a touch sensor in which the number of channels connected to a sensing circuit is reduced.

Another object of the present invention is to provide a touch sensor capable of reducing a bezel width.

Further, another object of the present invention is to provide a touch sensor capable of improving touch sensitivity and reducing touch recognition time.

The above objects of the present invention will be achieved by the following characteristics:

(1) A touch sensor, including: a driving electrode which includes at least two divided areas electrically separated from each other, wherein each divided area includes first patterns connected to each other in a first direction and second patterns extending from the first pattern in a second direction; and a receiving electrode which is formed on the same plane as the driving electrode in the second direction, wherein the driving electrodes are respectively connected to separate driving channels by driving electrode wirings for each divided area.

(2) The touch sensor according to the above (1), wherein the unit patterns of the receiving electrode are respectively connected to separate receiving channels by receiving electrode wirings.

(3) The touch sensor according to the above (2), wherein each of the driving electrode wirings is connected to one unit pattern for each divided area, and the receiving electrode wiring is disposed so as not to cross the driving electrode wirings.

(4) The touch sensor according to the above (2), wherein the driving channels are positioned at a center of the channels in parallel, and each of the driving electrode wirings is connected to one end of a first pattern at the shortest distance therefrom, or each of the driving channels is positioned at both ends of the channels, and is connected to the other end of the first pattern.

(5) The touch sensor according to the above (1), wherein the driving electrodes include at least four divided areas, and each of the receiving electrodes disposed in different divided areas is connected to one receiving channel by the receiving electrode wirings for each two unit patterns.

(6) The touch sensor according to the above (5), wherein the receiving electrode wirings are connected to each other through a bridge for each two unit patterns.

(7) The touch sensor according to the above (1), wherein the driving electrodes include four divided areas of an upper right portion, a lower right portion, an upper left portion, and a lower left portion, and each of the receiving electrodes disposed in upper and lower divided areas is connected to one receiving channel by the receiving electrode wirings for each two unit patterns.

(8) The touch sensor according to the above (7), wherein each of two driving electrode wirings is connected to one end of the first pattern, and each of the other two thereof is connected to the other end of the first pattern, and the receiving electrode wiring is disposed so as not to cross the driving electrode wiring.

(9) The touch sensor according to the above (7), wherein each of two driving channels is positioned at a center of the channels and is connected to one end of first pattern at the shortest distance therefrom, and each of the other two thereof is positioned at both ends of the channels and is connected to the other end of the first pattern.

The touch sensor of the present invention may sense touch positions over the entire area only by a smaller number of channels. Thereby, it is possible to significantly reduce the bezel width.

The touch sensor of the present invention may maintain excellent touch sensitivity while significantly shortening the touch recognition time.

The touch sensor of the present invention has a smaller number of channels to increase an interval between pads. Thereby, when a circuit board is connected to a pad part, excellent process stability may be exhibited.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention discloses a touch sensor, which includes: a driving electrode which includes at least two divided areas electrically separated from each other, wherein each divided area includes first patterns connected to each other in a first direction and second patterns extending from the first pattern in a second direction; and a receiving electrode which is formed on the same plane as the driving electrode in the second direction, wherein the driving electrodes are respectively connected to separate driving channels by driving electrode wirings for each divided area, such that it is possible to sense touch positions over the entire area only by a smaller number of channels. Thereby, it is possible to significantly reduce the bezel width, and may maintain excellent touch sensitivity while significantly shortening the touch recognition time.

Figure 1:
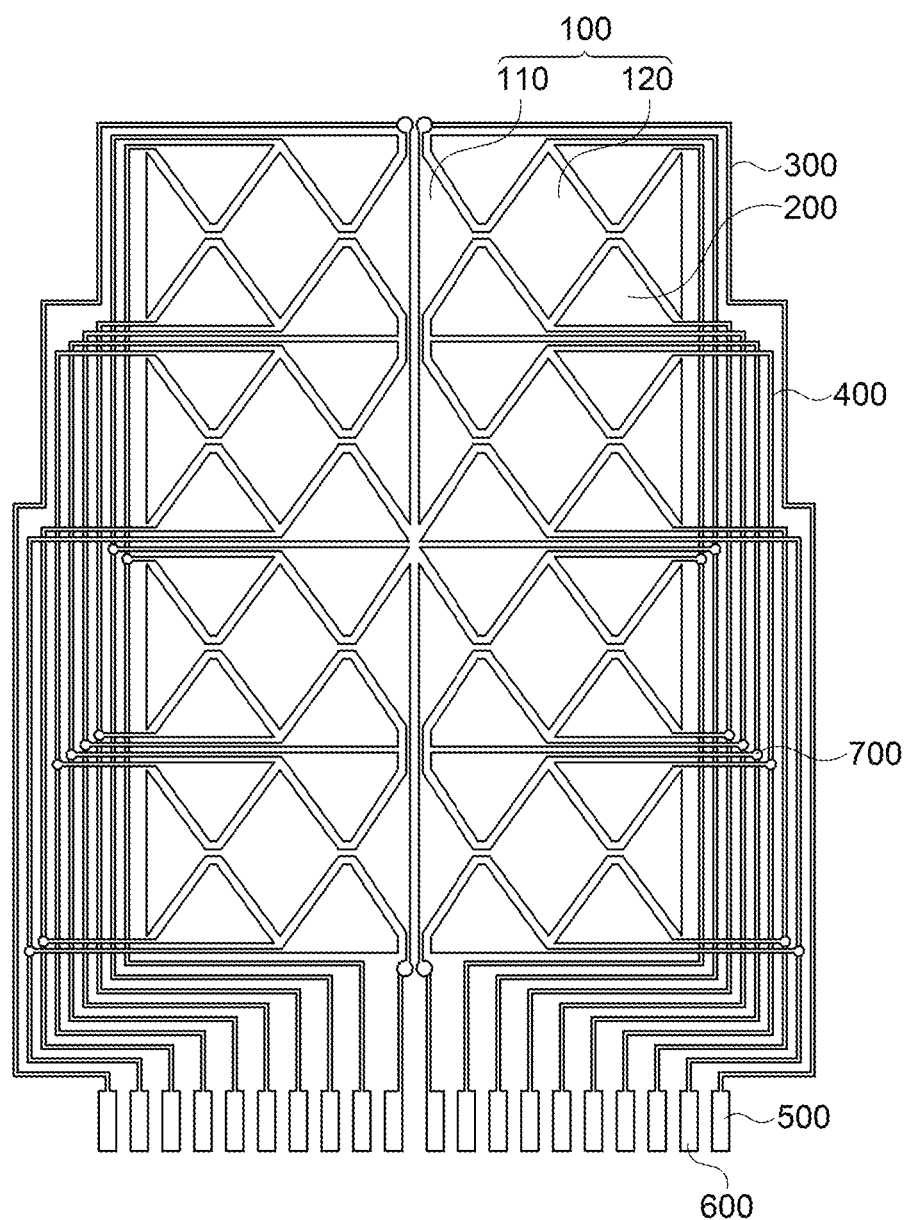
FIG. 1 is a plan view schematically illustrating an arrangement of a driving electrode, a receiving electrode, a wiring, and a channel of a touch sensor according to one embodiment of the present invention.
Figure 2:
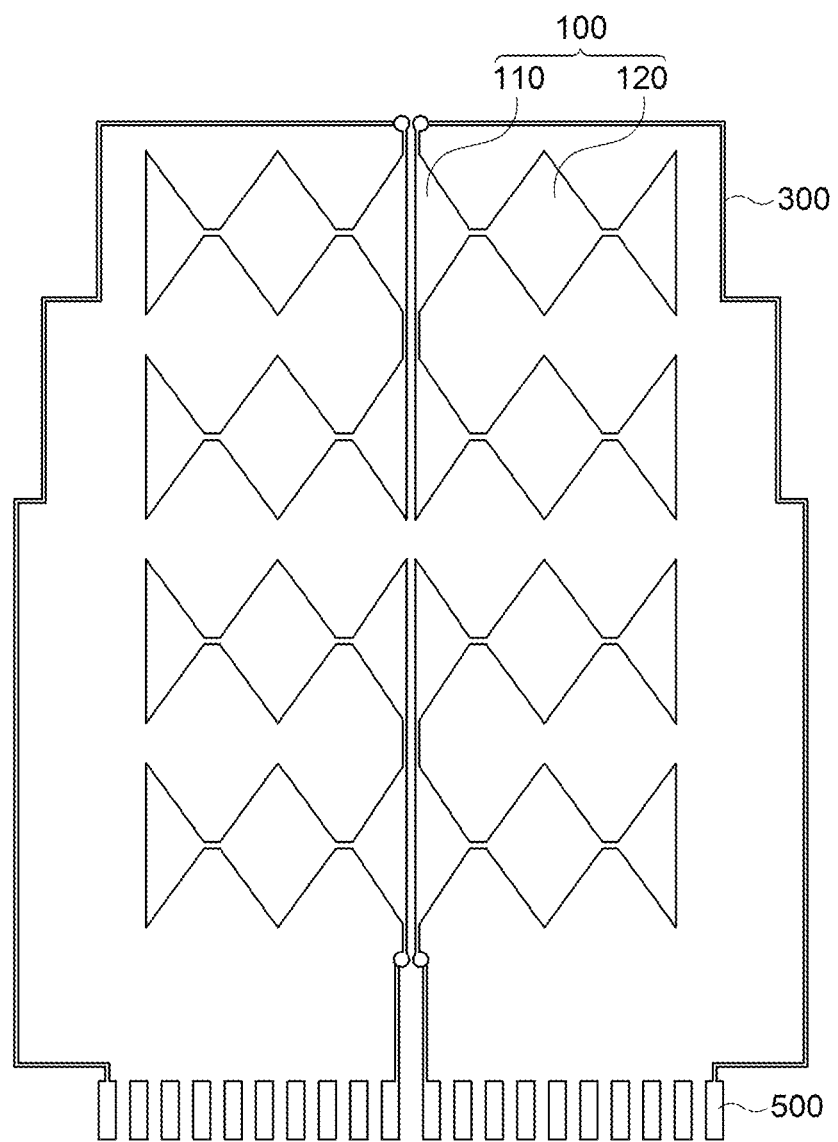
FIG. 2 is a plan view schematically illustrating an arrangement of the driving electrode, the driving electrode wiring, and the driving channel of the touch sensor according to one embodiment of the present invention.
Figure 3:
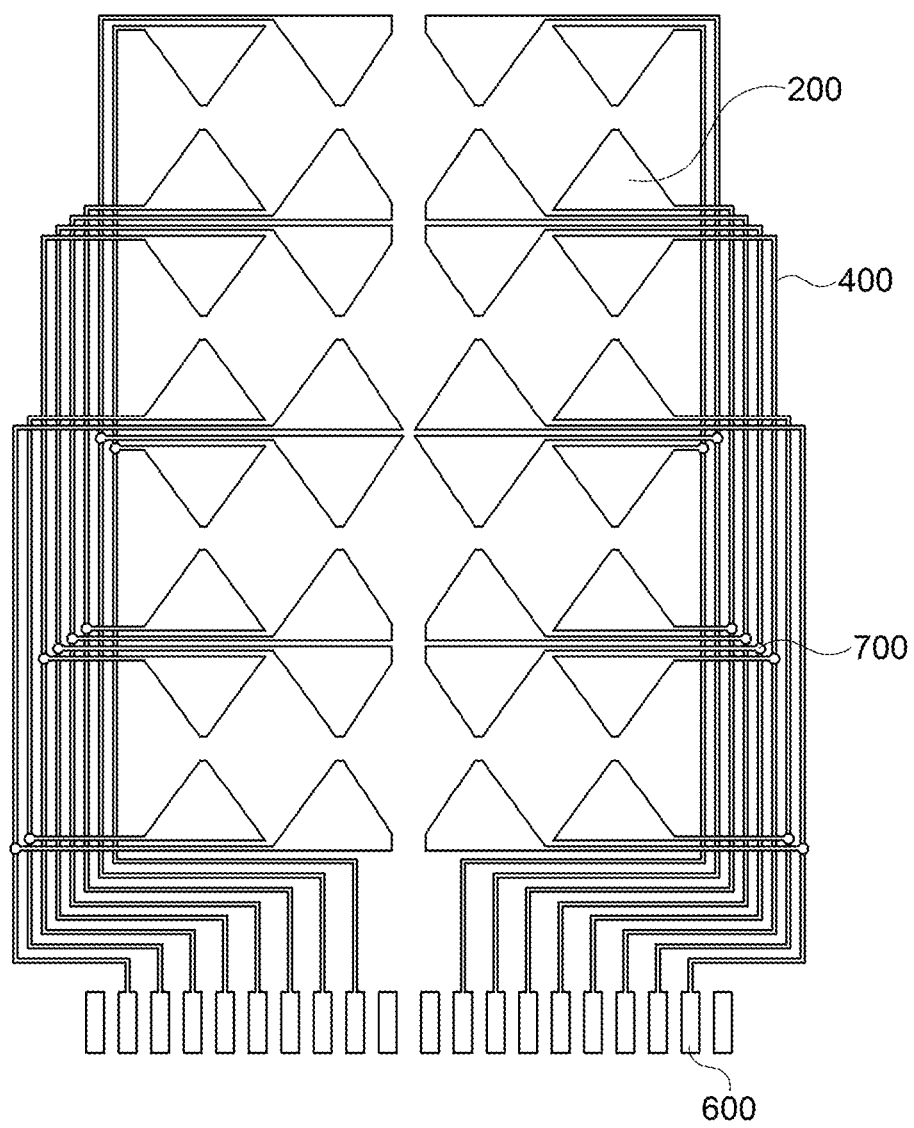
FIG. 3 is a plan view schematically illustrating an arrangement of the driving electrode, the driving electrode wiring, and the driving channel of the touch sensor according to one embodiment of the present invention.

FIG. 1 is a plan view schematically illustrating an arrangement of a driving electrode, a receiving electrode, a wiring, and a channel of a touch sensor according to the present invention, FIG. 2 is a plan view illustrating an arrangement of the driving electrode, the wiring, and the channel thereof, and FIG. 3 is a plan view illustrating an arrangement of the driving electrode, the wiring, and the channel thereof.

Hereinafter, a touch sensor according to one embodiment of the present invention will be described in detail with reference to the accompanying drawings.

A touch sensor of the present invention includes driving electrodes 100 and receiving electrodes 200.

The driving electrode 100 is an electrode to which a driving pulse is input, and includes at least two divided areas which are electrically separated from each other.

Each divided area includes first patterns 110 and second patterns 120.

The first patterns 110 are connected to each other in a first direction and the second patterns 120 extend the first pattern 110 in a second direction orthogonal to the first direction.

The first direction may be a Y-axis direction and the second direction may be an X-axis direction, and vice versa, but they are not limited thereto.

The first pattern 110 and the second pattern 120 may be used without being limited as long as they are a conductive material. For example, these patterns may be made of a material selected from metal oxides selected from a group consisting of indium tin oxide (ITO), indium zinc oxide (IZO), indium zinc tin oxide (IZTO), aluminum zinc oxide (AZO), gallium zinc oxide (GZO), fluorine tin oxide (PTO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), and aluminum zinc oxide-silver-aluminum zinc oxide (AZO-Ag-AZO); metals selected from a group consisting of gold (Au), silver (Ag), copper (Cu), molybdenum (Mo), and an Ag—Pd—Cu alloy (APC); metal nanowires selected from a group consisting of gold, silver, copper, and lead; carbon-based materials selected from a group consisting of carbon nanotube (CNT) and grapheme; and conductive polymer materials selected from a group consisting of poly (3,4-ethylenedioxythiophene) (PEDOT) and polyaniline (PANI). These materials may be used alone or in combination of two or more thereof.

The divided area is at least two areas which are randomly considered within the driving electrode 100, in which the respective areas are electrically separated from each other. That is, patterns which are disposed in different divided areas from each other are electrically separated from each other.

FIGS. 1 to 3 illustrate the case of including four divided areas, but it is not limited thereto. Hereinafter, the case of including two divided areas will be described in detail, but it is not limited thereto.

The driving electrode 100 may include two divided areas which are divided vertically and horizontally, as well as divided randomly.

The driving electrodes 100 are connected to sensing circuits (not illustrated) to receive driving pulses, and are connected to driving channels 500 of the sensing circuits by driving electrode wirings 300.

The driving electrode wiring 300 is generally formed in a bezel part (non-display area) of the touch sensor so as to prevent from being viewed by a user.

Types of metal forming the driving electrode wiring 300 are not particularly limited so long as they have excellent electric conductivity and low resistance, and may include, for example, molybdenum, silver, aluminum, copper, palladium, gold, platinum, zinc, tin, titanium, or an alloy of two or more thereof, and preferably, an alloy of silver, palladium, and copper.

In addition to the above metal, a material used to form the first pattern 100 and the second pattern 120 may be equally used.

All the channels may be positioned at the pad part, a channel connected to the driving electrode wiring 300 may correspond to the driving channel 500, and a channel connected to a receiving electrode wiring 400 may correspond to a receiving channel 600. The touch sensors of the present invention are respectively connected to the separate driving channels 500 by the driving electrode wirings 300 for each divided area.

That is, the touch sensor of the present invention may have the same number of driving channels 500 as the divided area, and therefore when the touch sensor has two divided areas, the touch sensor may sense the touch position over the entire area only by the two driving channels 500. Thereby, it is possible to reduce the bezel width. Further, as the wiring is complicated and the number of channels is increased, it is possible to prevent productivity from being reduced.

In addition, when unit patterns of each of the driving electrodes 100 are respectively connected to the driving channels 500, it is necessary to sequentially apply the driving pulse to each of the unit patterns for sensing the touch position. However, in the present invention, the unit patterns are connected to the driving channels 500 for each divided area including a plurality of first and second patterns 110 and 120, and therefore it is possible to sense the touch position over a wide area by applying the driving pulse only one time. Therefore, it is possible to shorten time required for detecting the touch position.

Each of the driving electrode wirings 300 is connected to one unit pattern for each divided area. As illustrated in FIGS. 1 and 2, the driving electrode wiring 300 may also be connected only to the first pattern 110, only to the second pattern 120, and to the first pattern 110 and the second pattern 120, respectively. Preferably, in order to minimize the wiring having a complicated arrangement, each of the driving electrode wirings 300 may be connected to one end of the first pattern 110.

The receiving electrode 200 is an electrode for sensing an induced electric field and transferring a sensing signal to the sensing circuit (not illustrated).

The receiving electrode 200 is positioned on the same plane as the driving electrode 100, and may have unit patterns formed in the second direction.

The receiving electrode 200 may be made of the same material as the driving electrode 100.

The receiving electrode 200 is connected to the receiving channel 600 by the receiving electrode wiring 400, and the unit patterns of the receiving electrode 200 may be respectively connected to separate receiving channels 600.

It is preferable that the receiving electrode wiring 400 is disposed so as not to cross the driving electrode wiring 300 in terms of suppressing an inter-channel interference.

A method for disposing so that the receiving electrode wiring 400 and the driving electrode wiring 300 do not cross each other may be variously implemented without being particularly limited. For example, these wirings may be controlled by appropriately arranging the positions of the driving channel 500 and the receiving channel 600.

Specifically, the driving channels 500 may be positioned at a center of the channels in parallel, each of the driving electrode wirings 300 may be connected to one end of the first pattern of the shortest distance, or each of the driving channels 500 may be positioned at both ends of the channels and connected to the other end of the first pattern.

Further, according to another embodiment of the present invention, four divided areas may be included.

In the touch sensor of the present invention, the driving electrodes 100 are respectively connected to the separate driving channels 500 for each divided area. Therefore, in this case, at least four driving channels 500 are required.

Each of the driving electrode wirings 300 is connected to one unit pattern for each four divided areas. Similarly, as illustrated in FIGS. 1 and 2, the driving electrode wiring 300 may also be connected only to the first pattern 110, only to the second pattern 120, and to the first pattern 110 and the second pattern 120, respectively. Preferably, in order to minimize the wiring having a complicated arrangement, each of two driving electrode wirings 300 may be connected to one end of the first pattern 110 and each of the other two thereof may be connected to the other end of the first pattern 110.

However, if including at least four divided areas, the number of receiving channels 600 may be significantly reduced. Hereinafter, the case of including four divided areas will be described in detail with reference to FIGS. 1 to 3, but it is not limited thereto.

If including four divided areas, each of the receiving electrodes 200 disposed in different divided areas is connected to one receiving channel 600 by the receiving electrode wiring 400 for each two unit patterns, and thus the number of receiving channels 600 may be reduced half compared to the case of including two divided areas.

A method for connecting the receiving electrodes 200 to one receiving channel 600 by the receiving electrode wiring 400 for each two unit patterns is not particularly limited. For example, the above method may be performed by connecting the receiving electrode wirings 400 of the two unit patterns to each other through a bridge 700.

As illustrated in FIGS. 1 and 2, in the case of including four divided areas, the driving electrode 100 may be divided into four areas such as an upper right portion, a lower right portion, an upper left portion, and a lower left portion. In this case, as illustrated in FIG. 3, each of the receiving electrodes 200 disposed in the divided areas of the upper and lower portions may be connected to one receiving channel 600 by the receiving electrode wiring 400 for each two unit patterns. In this case, it is possible to minimize the driving electrode wirings 300 having the complicated arrangement.

It is preferable that the receiving electrode wiring 400 is disposed so as not to cross the driving electrode wiring 300 in terms of suppressing the inter-channel interference.

A method for disposing so that the receiving electrode wiring 400 and the driving electrode wiring 300 do not cross each other may be variously implemented without being particularly limited. For example, these wirings may be controlled by appropriately arranging the positions of the driving channel 500 and the receiving channel 600.

Specifically, as illustrated in FIG. 2, the above method may be performed by positioning two of the driving channels 500 at the center of the channels and connecting them to one end of the first pattern 110 of the shortest distance and positioning the other two of the driving channels 500 at both ends of the channels, respectively, and then connecting them to the other ends of the first pattern 110, respectively.

The touch sensor of the present invention may be formed on a substrate.

The substrate 100 may be formed of any materials commonly used in the related are, and for example, may include polyethersulfone (PES), polyacrylate (PAR), polyetherimide (PEI), polyethylene napthalate (PEN), polyethylene terepthalate (PET), polyphenylene sulfide (PPS), polyallylate, polyimide, polycarbonate (PC), cellulose triacetate (TAC), cellulose acetate propionate (CAP) or the like.

While the present invention has been described with reference to the preferred embodiments, the present invention is not limited to the above-described embodiments, and it will be understood by those skilled in the related art that various modifications and variation may be made therein without departing from the scope of the present invention as defined by the appended claims, as well as these modifications and variations should not be understood separately from the technical spirit and prospect of the present invention.

What is claimed is:

1. A touch sensor, comprising:
a driving electrode which includes at least two divided areas electrically separated from each other, wherein each divided area includes first patterns connected to each other in a first direction and second patterns extending from the first pattern in a second direction; and
a receiving electrode which is formed on the same plane as the driving electrode in the second direction,
wherein the driving electrodes are respectively connected to separate driving channels by driving electrode wirings for each divided area,
wherein the receiving electrode includes a plurality of unit patterns spaced apart from each other; and
each unit pattern is respectively connected to separate receiving channels by each of a plurality of receiving electrode wirings, individually.

2. The touch sensor according to claim 1, wherein each of the driving electrode wirings is connected to one unit pattern for each divided area, and the receiving electrode wiring is disposed so as not to cross the driving electrode wirings.

3. The touch sensor according to claim 1, wherein the driving channels are positioned at a center of the channels in parallel, and each of the driving electrode wirings is connected to one end of a first pattern at the shortest distance therefrom, or
each of the driving channels is positioned at both ends of the channels, and is connected to the other end of the first pattern.

4. The touch sensor according to claim 1, wherein the driving electrodes include at least four divided areas, and each of the receiving electrodes disposed in different divided areas is connected to one receiving channel by the receiving electrode wirings for each two unit patterns.

5. The touch sensor according to claim 4, wherein the receiving electrode wirings are connected to each other through a bridge for each two unit patterns.

6. The touch sensor according to claim 1, wherein the driving electrodes include four divided areas of an upper right portion, a lower right portion, an upper left portion, and a lower left portion, and
each of the receiving electrodes disposed in upper and lower divided areas is connected to one receiving channel by the receiving electrode wirings for each two unit patterns.

7. The touch sensor according to claim 6, wherein each of two driving electrode wirings is connected to one end of the first pattern, and each of the other two thereof is connected to the other end of the first pattern, and
the receiving electrode wiring is disposed so as not to cross the driving electrode wiring.

8. The touch sensor according to claim 6, wherein each of two driving channels is positioned at a center of the channels and is connected to one end of first pattern at the shortest distance therefrom, and each of the other two thereof is positioned at both ends of the channels and is connected to the other end of the first pattern.

* * * * *